(12) United States Patent
Xiao et al.

(10) Patent No.: US 11,025,415 B2
(45) Date of Patent: Jun. 1, 2021

(54) CRYPTOGRAPHIC OPERATION METHOD, METHOD FOR CREATING WORKING KEY, CRYPTOGRAPHIC SERVICE PLATFORM, AND CRYPTOGRAPHIC SERVICE DEVICE

(71) Applicant: Advanced New Technologies Co., Ltd., Grand Cayman (KY)

(72) Inventors: Shuting Xiao, Zhejiang (CN); Xiaodan Lin, Zhejiang (CN); Haifeng Fang, Zhejiang (CN); Shengcai Gu, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/085,161

(22) Filed: Oct. 30, 2020

(65) Prior Publication Data
US 2021/0067326 A1    Mar. 4, 2021

Related U.S. Application Data

(63) Continuation of application No. PCT/CN2019/096309, filed on Jul. 17, 2019.

(30) Foreign Application Priority Data

Aug. 31, 2018    (CN) .......................... 201811010286.6

(51) Int. Cl.
*H04L 9/08* (2006.01)
(52) U.S. Cl.
CPC .......... *H04L 9/0822* (2013.01); *H04L 9/0825* (2013.01); *H04L 9/0827* (2013.01)

(58) Field of Classification Search
CPC ... H04L 9/0822; H04L 9/0827; H04L 9/0825; H04L 9/08
See application file for complete search history.

(56) References Cited

U.S. PATENT DOCUMENTS

| | | | |
|---|---|---|---|
| 9,379,890 B1 * | 6/2016 | Blakely ................ | H04L 9/0897 |
| 2012/0131354 A1 * | 5/2012 | French ................. | H04L 9/3271 |
| | | | 713/189 |
| 2018/0316490 A1 * | 11/2018 | Villegas ................ | H04L 9/0618 |

* cited by examiner

*Primary Examiner* — Ashokkumar B Patel
*Assistant Examiner* — Quazi Farooqui
(74) *Attorney, Agent, or Firm* — Finnegan, Henderson, Farabow, Garrett & Dunner, LLP

(57) ABSTRACT

A cryptographic service device includes: a processor; and a memory storing instructions executable by the processor, wherein the processor is configured to execute the instructions to operate as a registration module, a working key creation module, and a cryptographic operation calling module. The registration module is configured to call a secondary security module to generate an asymmetric key pair including a target public key and a target private key. The working key creation module is configured to receive a working key creation request of a business system, and call a primary security module to generate a working key for the business system. The cryptographic operation calling module is configured to receive a cryptographic operation request of the business system, and call a target security module to obtain an operation result of the target security module.

15 Claims, 8 Drawing Sheets

CRYPTOGRAPHIC OPERATION METHOD, METHOD FOR CREATING WORKING KEY, CRYPTOGRAPHIC SERVICE PLATFORM, AND CRYPTOGRAPHIC SERVICE DEVICE

CROSS-REFERENCE TO RELATED APPLICATIONS

This application is a continuation application of International Application No. PCT/CN2019/096309, filed on Jul. 17, 2019, which is based upon and claims priority to Chinese Patent Application No. 201811010286.6, filed on Aug. 31, 2018, the entire content of all of which is incorporated herein by reference.

TECHNICAL FIELD

This specification relates to the field of cryptographic technology, in particular to a cryptographic operation method, a method for creating a working key, a cryptographic service platform, and a cryptographic service device.

BACKGROUND

With the development of Internet technology, various business systems emerge endlessly, which brings great convenience to people's work and life, and also promotes economic growth and social progress. Cryptographic technology is an important technical means to protect business systems such as banks, securities, or transactions to ensure data confidentiality, integrity, non-repudiation, and availability in data storage, transmission, and access control.

For example, an enterprise can configure a cryptographic service platform. The cryptographic service platform is a system platform that provides key management and cryptographic operation services based on security modules. The platform, serving as a server of a business system, can provide application layer cryptographic services such as message verification, data encryption and decryption, and signature verification for the business system, ensure the security of data in the process of storage, transmission, and application, and prevent data from being stolen or maliciously tampered with. How to provide a more stable cryptographic service platform has become an urgent technical problem to be solved.

SUMMARY

According to a first aspect of embodiments of this specification, a cryptographic service device is provided, the cryptographic service device is connected to a plurality of security modules including a primary security module and at least one secondary security module, and each of the security modules has a master key. The cryptographic service device includes: a processor; and a memory storing instructions executable by the processor, wherein the processor is configured to execute the instructions to operate as a registration module, a working key creation module, and a cryptographic operation calling module. The registration module is configured to: call the secondary security module to generate an asymmetric key pair including a target public key and a target private key, and obtain and then store the target public key returned by the secondary security module. The working key creation module is configured to: receive a working key creation request of a business system, and with the target public key of the secondary security module as input, call the primary security module to generate a working key for the business system, and obtain from the primary security module: a working key ciphertext encrypted by the master key of the primary security module, and a working key ciphertext encrypted by the target public key of the secondary security module; with the working key ciphertext encrypted by the target public key of the secondary security module as input, call the secondary security module to obtain from the secondary security module: a working key ciphertext encrypted by the master key of the secondary security module after decrypting the input working key ciphertext with the target private key. The cryptographic operation calling module is configured to: receive a cryptographic operation request of the business system, the cryptographic operation request carrying data to be operated; determine a target security module responding to the cryptographic operation request; and with a working key ciphertext corresponding to the target security module and the data to be operated as input, call the target security module to obtain an operation result of the target security module, the operation result being obtained by the target security module using a stored master key to decrypt the working key ciphertext to obtain a working key, and encrypting the data to be operated with the working key obtained by decryption.

According to a second aspect of the embodiments of this specification, a cryptographic operation method is provided, including: receiving a cryptographic operation request initiated by a business system, the cryptographic operation request carrying data to be operated; determining a target security module responding to the cryptographic operation request, the target security module being one of a plurality of security modules including a primary security module and at least one secondary security module, and the security modules having master keys; obtaining a working key ciphertext corresponding to the target security module, the working key ciphertext being obtained in advance by: with a target public key generated by the secondary security module in advance as input, calling the primary security module to generate a working key for the business system, and obtain from the primary security module: a working key ciphertext encrypted by the master key of the primary security module, and a working key ciphertext encrypted by the target public key of the secondary security module; with the working key ciphertext encrypted by the target public key of the secondary security module as input, calling the secondary security module to obtain from the secondary security module: a working key ciphertext encrypted by the master key of the secondary security module after decrypting the input working key ciphertext with a target private key; and with the working key ciphertext and the data to be operated as input, calling the target security module to obtain an operation result returned by the target security module and send the operation result to the business system, the operation result being obtained by the target security module using a stored master key to decrypt the working key ciphertext to obtain a working key, and encrypting the data to be operated with the working key obtained by decryption.

According to a third aspect of the embodiments of this specification, a cryptographic service device is provided, including a processor, and a memory storing instructions executable by the processor, wherein the processor is configured to: receive a cryptographic operation request initiated by a business system, the cryptographic operation request carrying data to be operated; determine a target security module responding to the cryptographic operation request, the target security module being one of a primary security module or at least one secondary security module, and the security modules having master keys; and obtain a working key ciphertext corresponding to the target security module, the working key ciphertext being obtained in advance by: with a target public key generated by the secondary security module in advance as input, calling the primary security module to generate a working key for the business system, and obtaining from the primary security module: a working key ciphertext encrypted by the master key of the primary security module, and a working key ciphertext encrypted by the target public key of the secondary security module; with the working key ciphertext encrypted by the target public key of the secondary security module as input, calling the secondary security module to obtain from the secondary security module: a working key ciphertext encrypted by the master key of the secondary security module after decrypting the input working key ciphertext with the target private key. The processor is further configured to, with the working key ciphertext and the data to be operated as input, call the target security module to obtain an operation result returned by the target security module and send the operation result to the business system, the operation result being obtained by the target security module using the stored master key to decrypt the working key ciphertext to obtain a working key, and encrypting the data to be operated with the working key obtained by decryption.

According to a fourth aspect of the embodiments of this specification, a method for creating a working key is provided, including: receiving a working key creation request of a business system; with a target public key of a secondary security module as input, calling a primary security module to generate a working key for the business system, and obtaining from the primary security module: a working key ciphertext encrypted by a master key of the primary security module, and a working key ciphertext encrypted by the target public key of the secondary security module; and with the working key ciphertext encrypted by the target public key of the secondary security module as input, calling the secondary security module to obtain from the secondary security module: a working key ciphertext encrypted by the master key of the secondary security module after decrypting the input working key ciphertext with a target private key; wherein the target public key and the target private key are generated in advance by the secondary security module.

According to a fifth aspect of the embodiments of this specification, a cryptographic service device is provided, including a processor, and a memory storing instructions executable by the processor, wherein the processor is configured to: receive a working key creation request of a business system; with a target public key of a secondary security module as input, call a primary security module to generate a working key for the business system, and obtain from the primary security module: a working key ciphertext encrypted by a master key of the primary security module, and a working key ciphertext encrypted by the target public key of the secondary security module; and with the working key ciphertext encrypted by the target public key of the secondary security module as input, call the secondary security module to obtain from the secondary security module: a working key ciphertext encrypted by the master key of the secondary security module after decrypting the input working key ciphertext with a target private key; wherein the target public key and the target private key are generated in advance by the secondary security module.

According to a sixth aspect of the embodiments of the present specification, a non-transitory computer-readable storage medium has stored therein instructions that, when executed by a processor of a device, cause the device to perform the cryptographic operation method according to the second aspect.

The technical solutions provided by the embodiments of this specification may include the following beneficial effects.

In the embodiments of this specification, one of the security modules connected to the cryptographic service device serves as the primary security module, and the key management function of the cryptographic service device is provided by the primary security module. The primary security module is configured to generate the working key, and both the primary security module and secondary security modules can provide the cryptographic operation function required by the cryptographic service device.

Each security module independently generates its own master key, the working key of the business system is generated by the primary security module, and the cryptographic service device stores the working key ciphertext encrypted by the master key of the primary security module and the working key ciphertext encrypted separately by the master key of each secondary security module. Therefore, the master key is stored by the primary security module, the plaintext of the sensitive security parameters will not exceed the boundary of the security module, the key security will not be lost, and the security requirements of the key are met. The cryptographic service device can call any security module to respond to the cryptographic operation request of the business system. Therefore, the cryptographic service device is compatible with multiple types of security modules, such that the cryptographic service device will not be bound by a single security module manufacturer, the requirements of using multiple types of security modules are satisfied, and the cryptographic service device can provide a more stable cryptographic service.

It should be understood that the above general description and the following detailed description are only exemplary and explanatory, and do not limit this specification.

BRIEF DESCRIPTION OF THE DRAWINGS

The accompanying drawings are incorporated into this specification and constitute a part of this specification, show embodiments consistent with this specification, and are used to explain the principles of this specification together with the specification.

DETAILED DESCRIPTION

Figure 1:
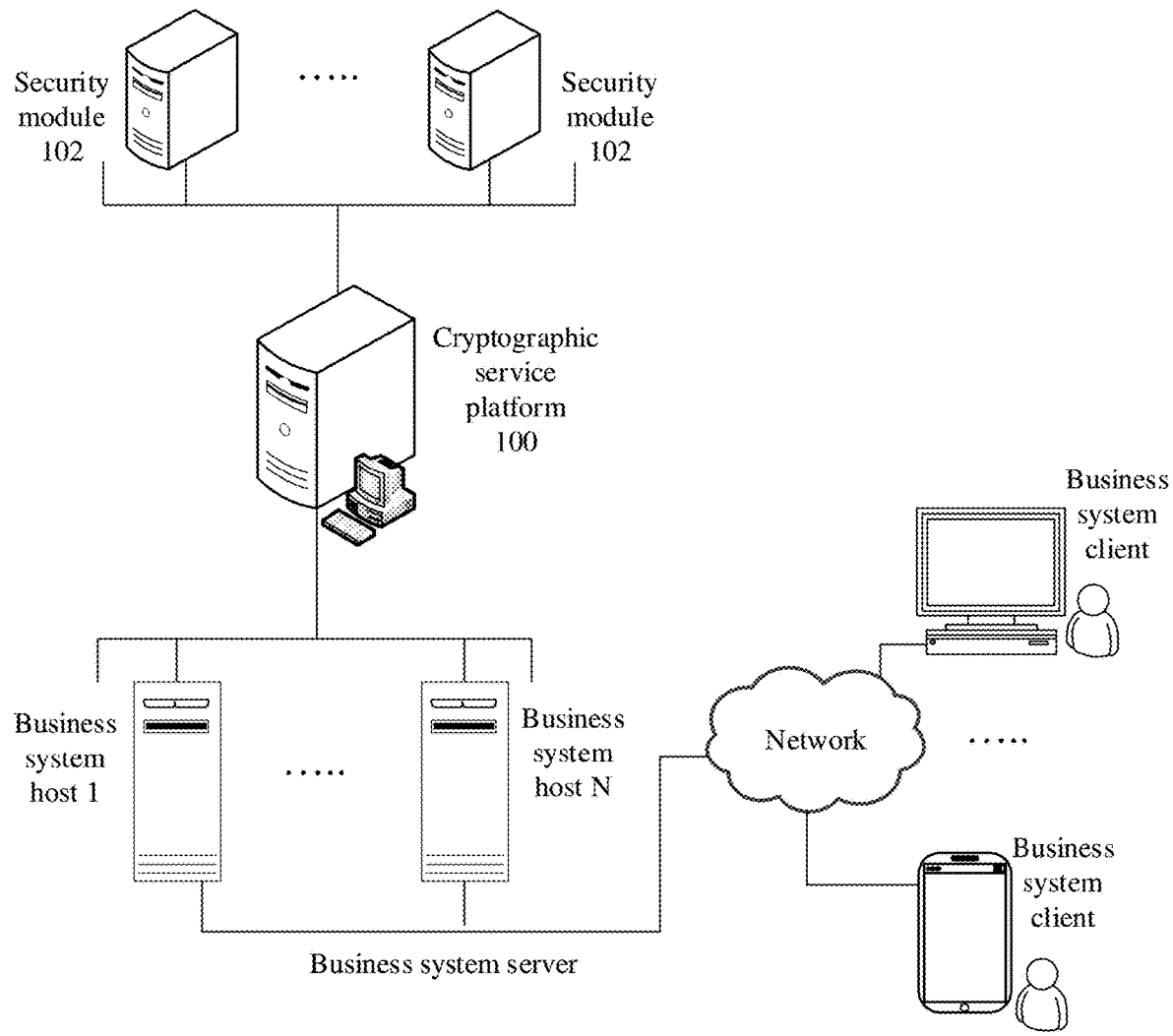
FIG. 1 is an application scenario diagram of a cryptographic service platform according to an example embodiment.

Example embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with this specification. Instead, they are merely examples of apparatuses and methods consistent with some aspects of this specification as detailed in the appended claims.

The terminology used in this specification is for the purpose of describing particular embodiments only, and is not intended to limit this specification. The term "and/or" as used herein refers to and encompasses any or all possible combinations of one or more associated listed items.

FIG. 1 is an application scenario diagram of a cryptographic service platform 100 according to an example embodiment. In FIG. 1, the cryptographic service platform 100 communicates with an application system host, and the application system host calls an interface provided by the cryptographic service platform 100 to use a cryptographic service, and underlying cryptographic operation and other services are completed through calling, by the cryptographic service platform 100, a security module 102.

The security module 102 may contain cryptographic algorithms and security functions, and may be relatively independent software, hardware, firmware, or a combination thereof to implement a key management mechanism. The security module 102 may be contained within a cryptographic boundary. The cryptographic boundary refers to a clearly defined continuous edge that establishes the physical and/or logical boundaries of the security module and includes all hardware, software, and/or firmware components of the security module 102.

Conventionally, security modules from different manufacturers have different generation algorithms for master keys. In order to avoid being bound by a single manufacturer and improve the robustness of the cryptographic service platform, the cryptographic service platform in the embodiments of this specification is built based on multiple types of security modules, so the cryptographic service platform is connected with multiple types of security modules. When multiple security modules are connected, the cryptographic service platform needs to be compatible with various security modules to provide cryptographic services for the business system in a unified manner, and also to meet the security of the cryptographic services.

In the embodiment of this specification, one of the security modules 102 connected to the cryptographic service platform 100 serves as a primary security module, and the key management function of the cryptographic service platform 100 is mainly provided by the primary security module. The security modules 102 other than the primary security module are referred to as secondary security modules in the embodiment of this specification, which can provide the cryptographic operation function required by the cryptographic service platform 100.

In an embodiment, each security module 102 independently generates its own master key, and a working key of a business system is generated by the primary security module. For example, the business system may include business system host 1, . . . , business system host N connected to one or more business system clients via a network. The cryptographic service platform 100 stores a working key ciphertext encrypted by the master key of the primary security module and a working key ciphertext encrypted separately by the master key of each secondary security module. In this embodiment, the master keys are stored by respective security modules, and the plaintext of the keys as a sensitive security parameter will not exceed the boundaries of the security modules, so the security requirements of the keys are met, and the security of the keys will not be lost. The cryptographic service platform 100 can call any security module 102 to respond to a cryptographic operation request of the business system. Therefore, the cryptographic service platform 100 is compatible with multiple types of security modules, such that the cryptographic service platform 100 may not be bound by a single security module manufacturer, the requirements of using multiple types of security modules are satisfied, and the cryptographic service platform 100 can provide a more stable cryptographic service.

Figure 2A:
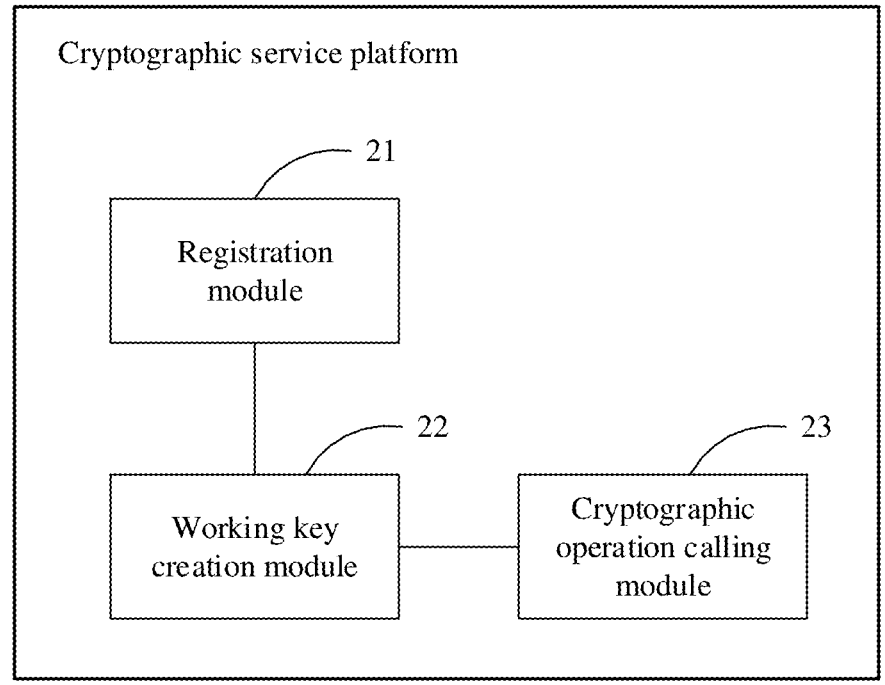
FIG. 2A is a block diagram of a cryptographic service device according to an example embodiment.

FIG. 2A is a block diagram of a cryptographic service device operating as a cryptographic service platform, according to an example embodiment. For example, the cryptographic service platform may be the cryptographic service platform 100 (FIG. 1). As shown in FIG. 2A, the cryptographic service platform may include a registration module 21, a working key creation module 22, and a cryptographic operation calling module 23, which are respectively configured to register a secondary security module, create the working key of the business system, and call a security module to respond to the cryptographic operation request of the business system.

In an embodiment, the registration module 21 is configured to: call the secondary security module to generate an asymmetric key pair including a target public key and a target private key, and obtain and then store the target public key returned by the secondary security module.

In an embodiment, the working key creation module 22 is configured to: receive a working key creation request of the business system, and with the target public key of the secondary security module as input, call the primary security module to generate the working key for the business system, and obtain the following returned by the primary security module: a working key ciphertext encrypted by the master key of the primary security module, and a working key ciphertext encrypted by the target public key of the secondary security module; with the working key ciphertext encrypted by the target public key of the secondary security module as input, call the secondary security module to obtain the following returned by the secondary security module: a working key ciphertext encrypted by its own master key after decrypting the input working key ciphertext with the target private key.

In an embodiment, the cryptographic operation calling module 23 is configured to: receive a cryptographic operation request of the business system, the cryptographic operation request carrying data to be operated; determine a target security module responding to the cryptographic operation request; and with a working key ciphertext corresponding to the target security module and the data to be operated as input, call the target security module to obtain an operation result of the target security module, the operation result being obtained in a way that the target security module uses the stored master key to decrypt the working key ciphertext to obtain a working key, and then the data to be operated is encrypted with the working key obtained by decryption.

Registration of a secondary security module will be described below. In an embodiment, a security module needs to set a master key for work before working, and the security module uses the master key to encrypt a key to be protected. The security module itself will have a key derivation algorithm to generate the key. In this embodiment, each security module generates its own master key. Due to the subsequent working key creation process of the business system, in this embodiment, the secondary security module generates an asymmetric key pair including the target public key and the target private key during registration, and provides it to the cryptographic service platform to save the target public key, such that the cryptographic service platform can safely transmit and save data when the primary security module creates the working key subsequently.

For example, it may be that a key generation service interface of the secondary security module is called, the secondary security module generates the asymmetric key pair including the target public key and the target private key, and the cryptographic service platform obtains and then stores the target public key returned by the secondary security module. After the primary security module creates the working key, the working key can be encrypted with the target public key and then securely transmitted to the secondary security module, which will be described in detail below.

In addition, since multiple types of keys may be stored in the secondary security module, in order to distinguish the keys, the secondary security module may also use target private key indication data encrypted by the master key, and the indication data is used to correspond to the target private key. The target private key indication data can be provided to the cryptographic service platform, such that when the secondary security module needs to use the target private key later, the cryptographic service platform can transmit the target private key indication data to the secondary security module for the secondary security module to determine which private key should be obtained for subsequent process. In an embodiment, the target private key indication data encrypted by the master key of the secondary security module may include: a target private key ciphertext generated by encrypting the target private key with the master key of the secondary security module, or a target private key identifier encrypted with the master key of the secondary security module.

Since it is necessary to call the primary security module with the target public key as input subsequently, in order to further improve the security of subsequent data transmission, in an embodiment, the cryptographic service platform may also take the target public key of the secondary security module as input to call the primary security module, the primary security module authenticates the target public key and obtains a key check value obtained through performing, by the primary security module, message authentication code value calculation on the target public key, and the key check value is used for subsequent checking of the primary security module to prevent data from being tampered with.

Figure 2B:
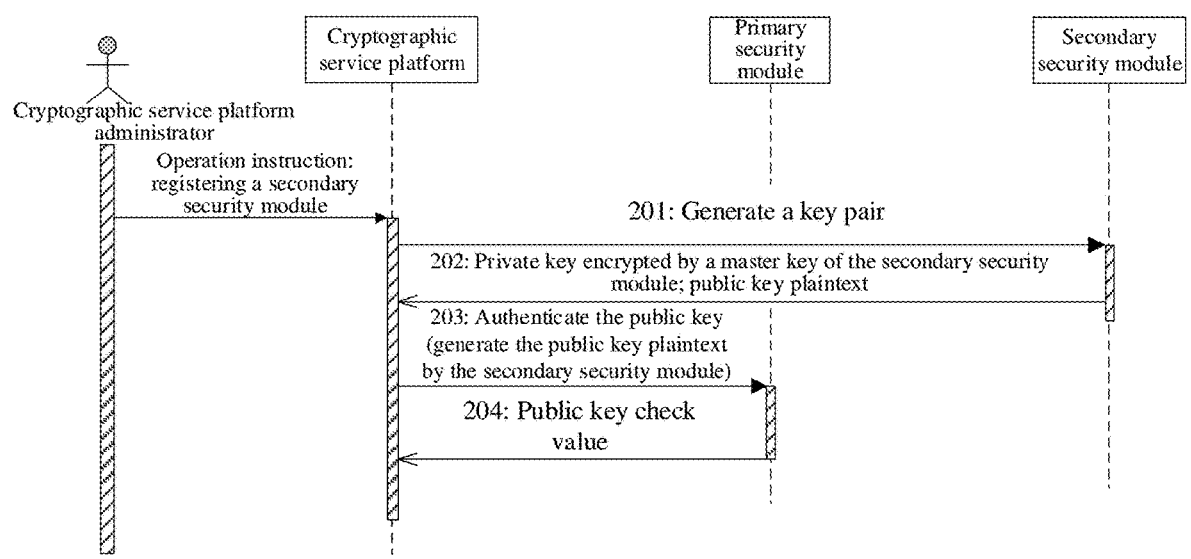
FIG. 2B is a schematic diagram of a registration process of a secondary security module according to an example embodiment.

FIG. 2B is a schematic diagram of a registration process of the secondary security module according to an example embodiment. For example, an administrator of the cryptographic service platform issues an operation instruction of registering a secondary security module to the cryptographic service platform, and after receiving the instruction, the cryptographic service platform performs the following operations.

In operation 201, the cryptographic service platform calls a key pair generation service interface of the secondary security module.

In operation 202, in response to the instruction, the secondary security module generates an asymmetric key pair including the target private key and the target public key in the module, and the secondary security module returns: the target private key ciphertext encrypted with the master key of the secondary security module as the above indication data (which may also be the target private key identifier in other examples) and the target public key in plaintext form.

In operation 203, the cryptographic service platform calls a public key authentication service interface of the primary security module to cause the primary security module to authenticate the target public key generated by the secondary security module.

In operation 204, the primary security module uses an internal master key to perform message authentication code calculation on the target public key to obtain and return the key check value.

Creation of the working key for the business system will be described below. For example, the working key may be a key created for the business system through which the security module provides a cryptographic operation function for the business system. In an embodiment, the process of creating the working key may include: receiving a working key creation request of the business system, and with the target public key of the secondary security module as input, calling the primary security module to generate the working key for the business system, and obtaining the following returned by the primary security module: a working key ciphertext encrypted by the master key of the primary security module, and a working key ciphertext encrypted by the target public key of the secondary security module; and with the working key ciphertext encrypted by the target public key of the secondary security module as input, calling the secondary security module to obtain the following returned by the secondary security module: a working key ciphertext encrypted by its own master key after decrypting the input working key ciphertext with the target private key.

In the embodiment, after the working key is created by the primary security module, the primary security module uses its own master key to encrypt and obtain the working key ciphertext of the primary security module. Each secondary security module may also encrypt the working key with its own master key to obtain the working key ciphertext; and the working key may be transferred from the primary security module to the secondary security module by the cryptographic service platform, so this embodiment uses the target public key to realize the above encrypted transmission process.

Figure 2C:
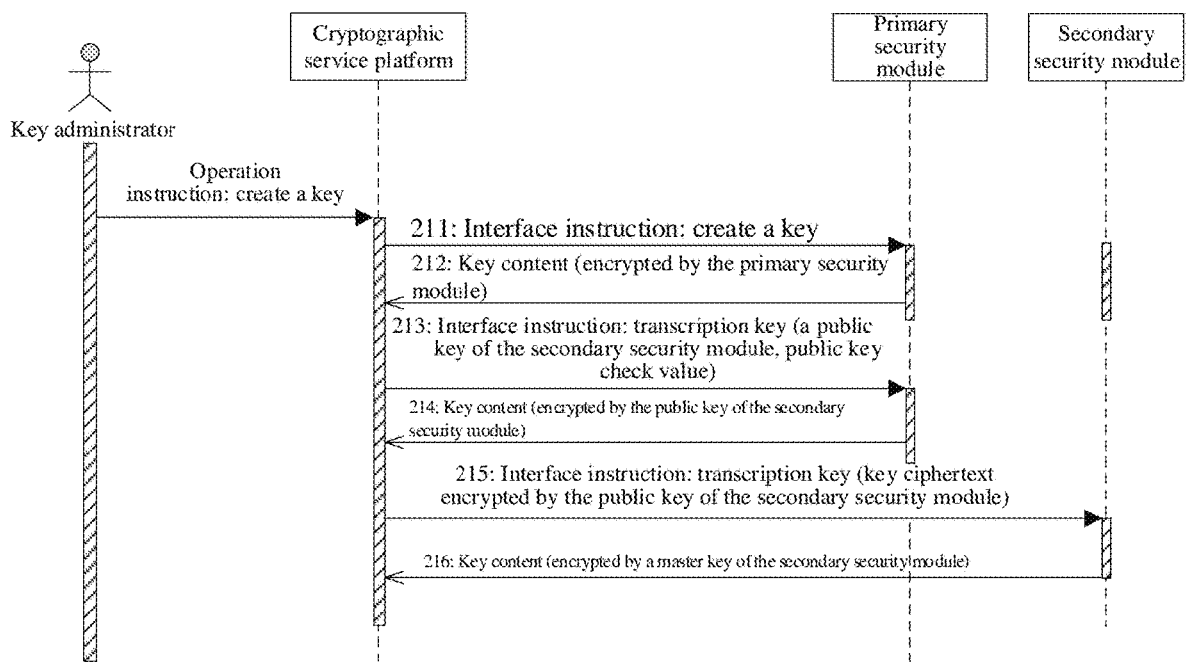
FIG. 2C is a schematic diagram of a working key creation process according to an example embodiment.

As described above, the asymmetric key pair may be used as the target key. FIG. 2C is a schematic diagram of a process of creating the working key according to an example embodiment. For example, a key administrator initiates an operation instruction of creating a key, and after receiving the operation instruction, the cryptographic service platform performs the following operations.

In operation 211, the cryptographic service platform calls a key creation interface of the primary security module.

In operation 212, after the primary security module is called, a corresponding working key is generated by using the key derivation algorithm, and is encrypted with the master key of the primary security module and returned. For example, the working key may include multiple types, the private keys and secret keys can be encrypted, while the public key can be returned directly in plaintext without encryption. The public key may also be encrypted, which is not limited in this embodiment.

In operation 213, the cryptographic service platform calls a key transcryption interface of the primary security module, and enters the key ciphertext (the working key ciphertext encrypted by the master key of the primary security module), the target public key of the secondary security module, and the aforementioned key check value.

In operation 214, after the primary security module is called, the master key is used to decrypt to obtain the working key; at the same time, the target public key is checked based on the message authentication code value, after determining that the target public key is legal (indicating that the target public key is safe and has not been tampered with, etc.), the working key is encrypted by using the target public key of the secondary security module and returned.

In operation 215, the cryptographic service platform calls a key transcryption interface of the secondary security module, and enters the working key ciphertext (encrypted by the target public key of the secondary security module) and a target private key ciphertext of the secondary security module (encrypted by the target public key of the secondary security module).

In operation 216, after the secondary security module is called, its own master key is used to decrypt to obtain the target private key, the working key ciphertext is decrypted by using the target private key obtained by decryption to obtain the working key, and then the working key is encrypted by using its own master key to obtain the working key ciphertext, which is returned to the cryptographic service platform.

After the execution is completed, the cryptographic service platform records multiple working key ciphertexts: contents of the ciphertext encrypted by the master key of the primary security module and ciphertexts encrypted by the master keys of various secondary security modules.

Cryptographic operation will be described below. The cryptographic service platform provides the cryptographic operation service to the business system. The cryptographic service platform can receive the cryptographic operation request from the business system, and the cryptographic operation request carries data to be operated. Generally, the cryptographic service platform may provide services for multiple business systems, and each business system may also correspond to multiple working keys. Therefore, the cryptographic operation request may also carry a key identifier for the cryptographic service platform to determine which working key should be used to provide cryptographic operation service.

In an embodiment, there are multiple types of security modules connected, and the cryptographic service platform can select any one of the security modules to respond to the cryptographic operation request. In order to facilitate distinguishing the security modules, in this embodiment, the security module selected by the cryptographic service platform is referred to as a target security module. The selection mode of the cryptographic service platform can be flexibly configured according to needs, for example, based on the current processing capability of each security module, the number of tasks being processed, and the like.

After determining the target security module that responds to the cryptographic operation request, the cryptographic service platform can obtain the working key ciphertext corresponding to the target security module from the stored multiple working key ciphertexts. The cryptographic service platform can take the working key ciphertext as input to call the target security module. After being called, the target security module can decrypt the working key ciphertext by using the stored own master key to obtain the working key, and then use the working key to perform operation on the data to be operated. The operation result can be returned to the cryptographic service platform and returned by the cryptographic service platform to the business system.

Figure 2D:
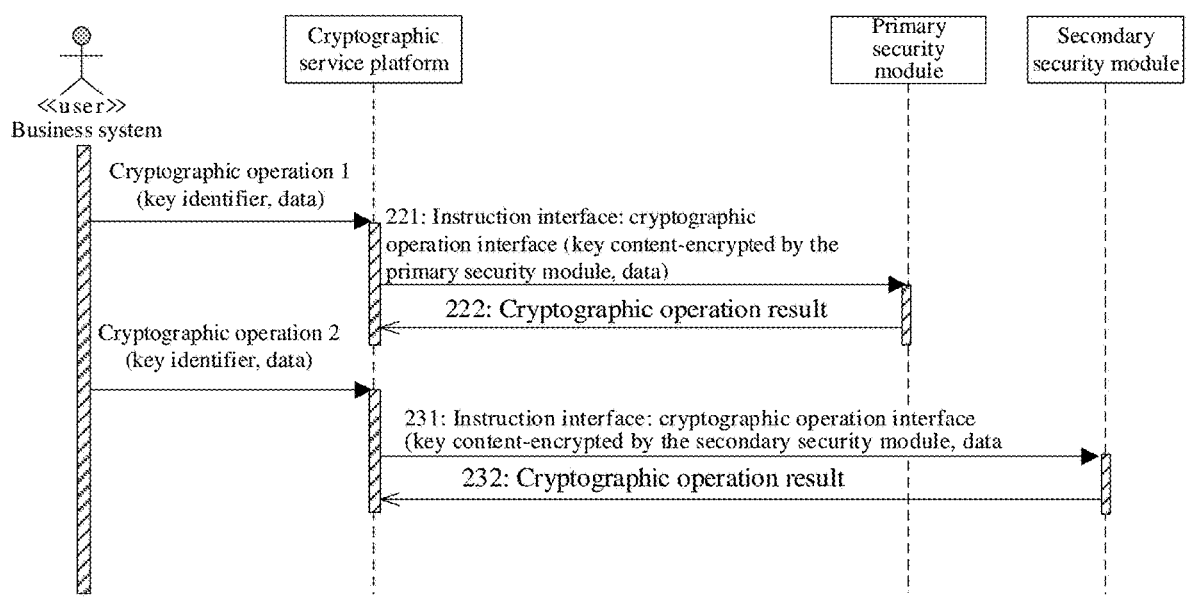
FIG. 2D is a schematic diagram of a cryptographic operation according to an example embodiment.

FIG. 2D is a schematic diagram of a cryptographic operation according to an example embodiment. For example, after receiving the cryptographic operation request, the cryptographic service platform determines which security module should be used for this operation. The specific selection logic is not limited, and the logic can be formulated according to needs of the cryptographic service platform for traffic management of the security module.

In operation 221, if the selection result is the primary security module, the cryptographic service platform calls a cryptographic operation interface of the primary security module, and the input data is the key content of the working key encrypted by the primary security module and the data to be operated.

In operation 222, the primary security module uses the internal master key to decrypt to obtain the plaintext of the working key, performs the cryptographic operation on the data to be operated, and returns the operation result to the cryptographic service platform.

In operation 231, if the selection result is a secondary security module, the cryptographic service platform calls a cryptographic operation interface of the secondary security module, and the input data is the key content of the working key encrypted by the secondary security module and the data to be operated.

In operation 232, the secondary security module uses an internal master key to decrypt to obtain the plaintext of the working key, performs the cryptographic operation on the data to be operated, and returns the result to the cryptographic service platform.

In embodiments of the specification, the cryptographic service platform may be implemented by a computer device, such as a server. In addition, each security module (FIG. 1) and each module of the cryptographic service platform (FIG. 2A) may be implemented by software, or hardware or a combination of hardware and software. For example, the module may be formed by reading corresponding computer program instructions in a non-volatile memory into a memory to run through the processor where it is located.

Figure 3:
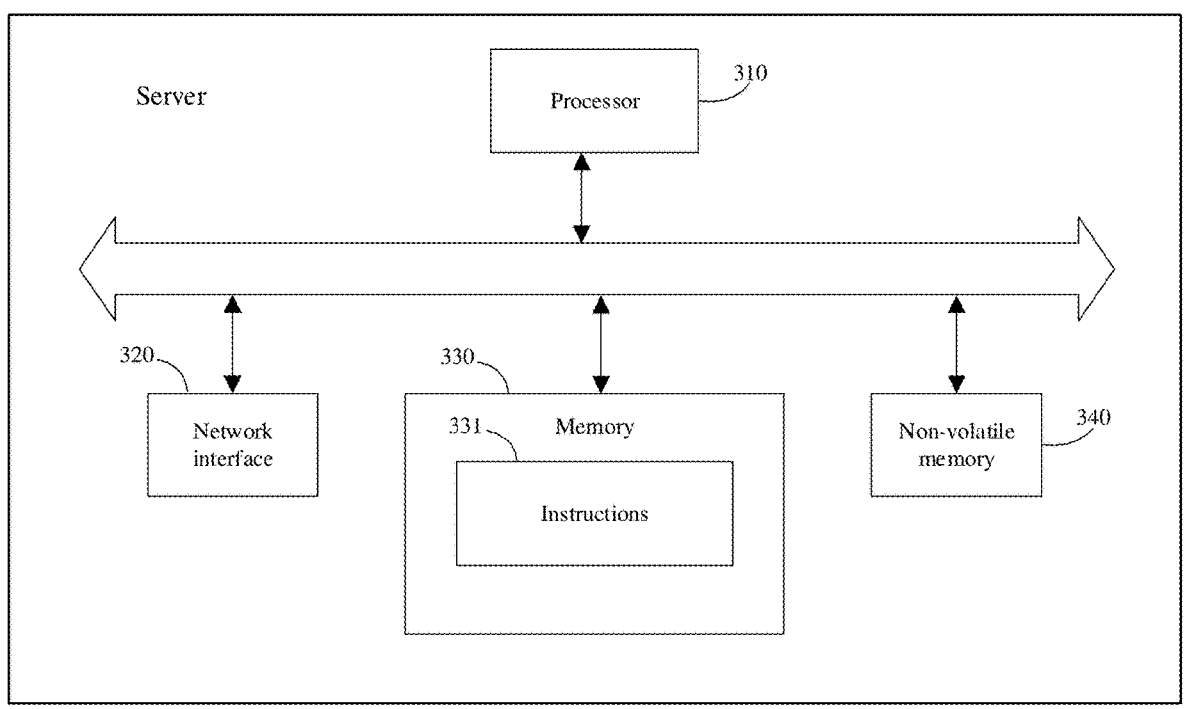
FIG. 3 is a schematic diagram of a computer device implementing a cryptographic service platform, according to an example embodiment.

FIG. 3 is a schematic diagram of a computer device implementing a cryptographic service platform, according to an example embodiment. For example, the computer device may be a server, and include a processor 310, a network interface 320, a memory 330, and a non-volatile memory 340. For example, the memory 330 may include instructions 331 for implementing the server where cryptographic service platform.

Figure 4:
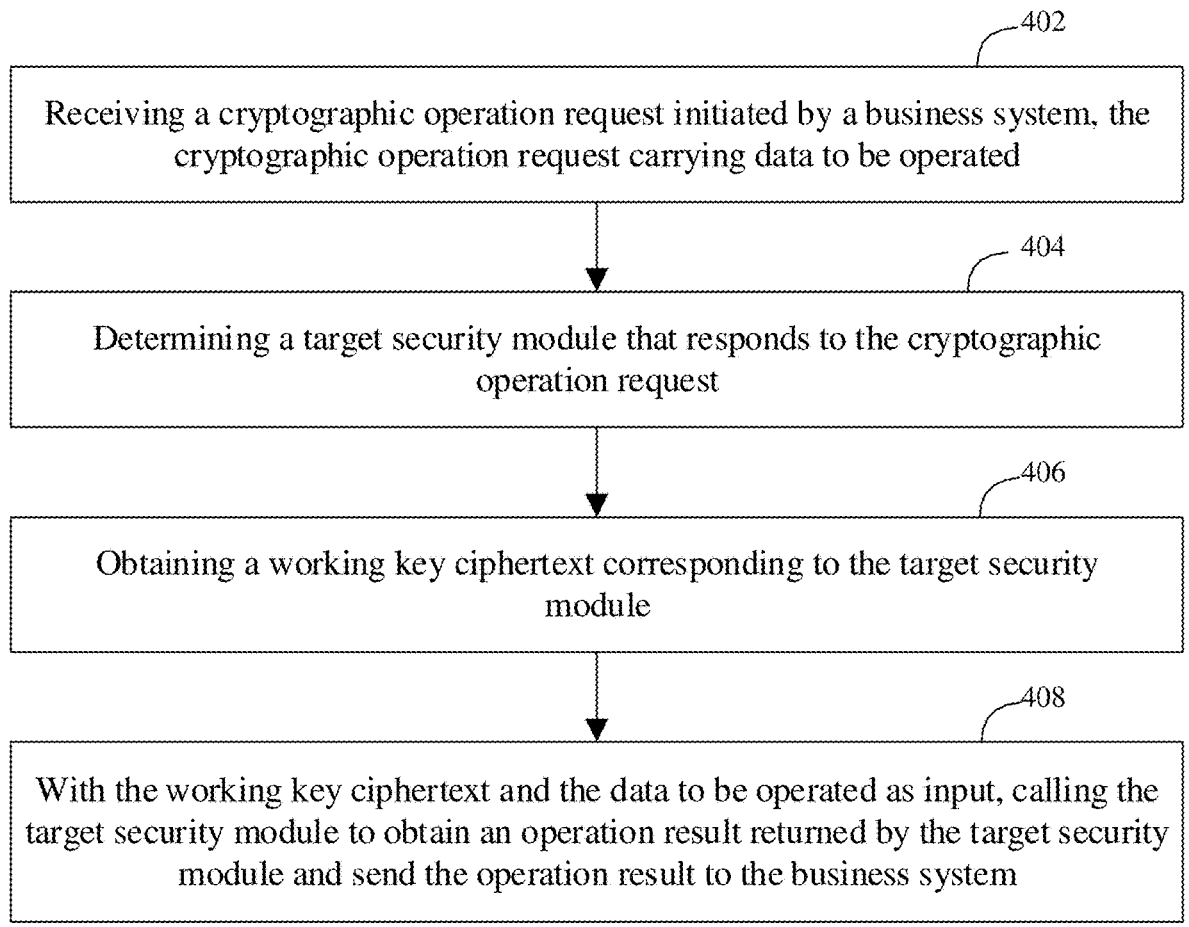
FIG. 4 is a flowchart of a cryptographic operation method according to an example embodiment.

FIG. 4 is a flowchart of a cryptographic operation method according to an example embodiment, which includes the following steps.

In step 402, a cryptographic operation request initiated by a business system is received, the cryptographic operation request carrying data to be operated;

In step 404, a target security module that responds to the cryptographic operation request is determined, the target security module being one of a primary security module or at least one secondary security module, and the security modules having master keys.

In step 406, a working key ciphertext corresponding to the target security module is acquired, the working key ciphertext being obtained in the following way in advance: with a target public key generated by the secondary security module in advance as input, calling the primary security module to generate a working key for the business system, and obtaining the following returned by the primary security module: a working key ciphertext encrypted by the master key of the primary security module, and a working key ciphertext encrypted by the target public key of the secondary security module; with the working key ciphertext encrypted by the target public key of the secondary security module as input, calling the secondary security module to obtain the following returned by the secondary security module: a working key ciphertext encrypted by its own master key after decrypting the input working key ciphertext with the target private key.

In step 408, with the working key ciphertext and the data to be operated as input, the target security module is called to obtain an operation result returned by the target security module and send the operation result to the business system, the operation result being obtained in a way that the target security module uses the stored master key to decrypt the working key ciphertext to obtain a working key, and then the data to be operated is encrypted with the working key obtained by decryption.

In an embodiment, the target private key stored by the registration module is encrypted with the master key of the secondary security module.

In an embodiment, the method further includes: obtaining target private key indication data encrypted by the master key of the secondary security module; and when the secondary security module is called, taking the target private key indication data as input, for the secondary security module to obtain a target private key by using the master key to decrypt, and decrypt the input working key ciphertext.

In an embodiment, the target private key indication data encrypted by the master key of the secondary security module includes: the target private key ciphertext from encryption of the target private key with the master key of the secondary security module, or the target private key identifier encrypted by the master key of the secondary security module.

In an embodiment, the method further includes: with the target public key as input, calling the primary security module, and obtaining a key check value obtained through performing, by the primary security module, message authentication code value calculation on the target public key; and when the primary security module is called to generate a working key for the business system, taking the key check value as input, for the primary security module to check the input target public key of the secondary security module.

For the implementation process of each step in the above cryptographic operation method, reference may be made to the implementation process of the functions and actions of each module in the above cryptographic service platform, which will not be repeated here.

Figure 5:
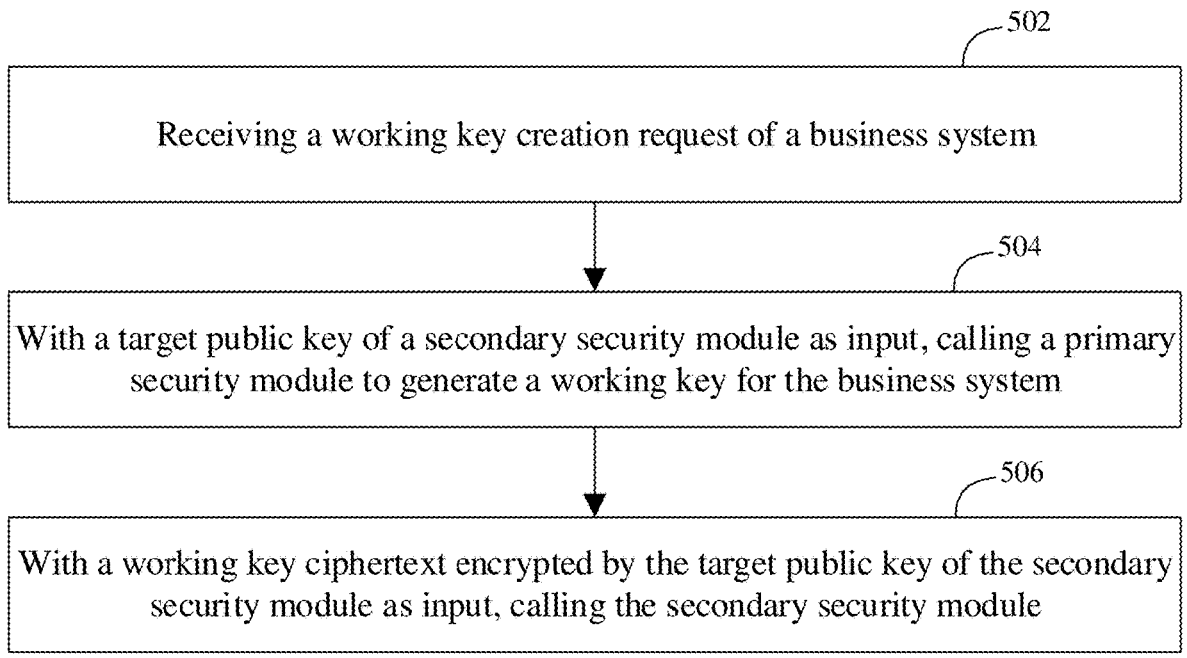
FIG. 5 is a flowchart of a method for creating a working key according to an example embodiment.

FIG. 5 is a flow chart of a method for creating a working key according to an example embodiment.

In step 502, a working key creation request of a business system is received.

In step 504, with a target public key of a secondary security module as input, a primary security module is called to generate a working key for the business system, and obtaining the following returned by the primary security module: a working key ciphertext encrypted by a master key of the primary security module, and a working key ciphertext encrypted by the target public key of the secondary security module.

In step 506, with the working key ciphertext encrypted by the target public key of the secondary security module as input, calling the secondary security module to obtain the following returned by the secondary security module: a working key ciphertext encrypted by its own master key after decrypting the input working key ciphertext with a target private key; wherein the target public key and the target private key are generated in advance by the secondary security module.

In the embodiment, one of the security modules connected to the cryptographic service platform serves as the primary security module, and the key management function of the cryptographic service platform is provided by the primary security module. The primary security module is configured to generate the working key, and both the primary security module and secondary security modules can provide the cryptographic operation function required by the cryptographic service platform.

In the embodiment, each security module independently generates its own master key, the working key of the business system is generated by the primary security module, and the cryptographic service platform stores the working key ciphertext encrypted by the master key of the primary security module and the working key ciphertext encrypted separately by the master key of each secondary security module. In this embodiment, the master key is stored by the primary security module, the plaintext of the sensitive security parameters will not exceed the boundaries of the security modules, the key security will not be lost, and therefore, the security requirements of the keys are met.

For the implementation process of each step in the above method for creating a work key, reference may be made to the implementation process of the functions and actions of each module in the above cryptographic service platform, which will not be repeated here.

Embodiments of this specification also provide a computer device, including a processor, and a memory storing instructions executable by the processor, wherein the processor is configured to perform: receiving a cryptographic operation request initiated by a business system, the cryptographic operation request carrying data to be operated; determining a target security module that responds to the cryptographic operation request, the target security module being one of a primary security module or at least one secondary security module, and the security modules having master keys; obtaining a working key ciphertext corresponding to the target security module, the working key ciphertext being obtained in the following way in advance: with a target public key generated by the secondary security module in advance as input, calling the primary security module to generate a working key for the business system, and obtaining the following returned by the primary security module: a working key ciphertext encrypted by the master key of the primary security module, and a working key ciphertext encrypted by the target public key of the secondary security module; with the working key ciphertext encrypted by the target public key of the secondary security module as input, calling the secondary security module to obtain the following returned by the secondary security module: a working key ciphertext encrypted by its own master key after decrypting the input working key ciphertext with a target private key; and with the working key ciphertext and the data to be operated as input, calling the target security module to obtain an operation result returned by the target security module and send the operation result to the business system, the operation result being obtained in a way that the target security module uses the stored master key to decrypt the working key ciphertext to obtain a working key, and then the data to be operated is encrypted with the working key obtained by decryption.

Embodiments of this specification also provide a cryptographic service device, including a processor, and a memory storing instructions executable by the processor, wherein the processor is configured to perform: receiving a working key creation request of a business system; with a target public key of a secondary security module as input, calling a primary security module to generate a working key for the business system, and obtaining the following returned by the primary security module: a working key ciphertext encrypted by a master key of the primary security module, and a working key ciphertext encrypted by the target public key of the secondary security module; and with the working key ciphertext encrypted by the target public key of the secondary security module as input, calling the secondary security module to obtain the following returned by the secondary security module: a working key ciphertext encrypted by its own master key after decrypting the input working key ciphertext with a target private key; wherein the target public key and the target private key are generated in advance by the secondary security module.

The apparatus embodiments correspond to the method embodiments, and reference may be made to the description of the method embodiments for relevant parts. The apparatus embodiments described above are examples, wherein the modules described as separate components may or may not be physically separated, and the components displayed as modules may be located in one place, or may be distributed to multiple networks. Some or all of the modules may be selected according to actual needs.

Example embodiments of this specification are described above. In some cases, the operations or steps recited in the claims can be performed in a different order than in the embodiments and can still achieve the desired results. In addition, the processes depicted in the drawings are not necessarily required to be in the shown particular order or sequential order to achieve the desired results. In some embodiments, multitasking and parallel processing may be advantageous.

Other embodiments will be apparent to those skilled in the art from consideration of the specification. This specification is intended to cover any variations, uses, or adaptations of this specification following the general principles of this specification and including common general knowledge or common technical means in the technical field not described for in this specification. The specification and embodiments are examples only, and the true scope and spirit of this specification are indicated by the following claims.

It should be understood that this specification is not limited to the precise structure that has been described above and shown in the drawings, and that various modifications and changes can be made without departing from the scope thereof. The scope of this specification is limited only by the appended claims.

The invention claimed is:

1. A cryptographic service device, the cryptographic service device being connected to a plurality of security modules including a primary security module and at least one secondary security module, and each of the security modules having a master key, the cryptographic service device comprising:
   a processor; and
   a memory storing instructions executable by the processor,
   wherein the processor is configured to execute the instructions to operate as a registration module, a working key creation module, and a cryptographic operation calling module, wherein:
   the registration module is configured to: call the secondary security module to generate an asymmetric key pair comprising a target public key and a target private key, and obtain and store the target public key returned by the secondary security module;
   the working key creation module is configured to: receive a working key creation request of a business system, and with the target public key of the secondary security module as input, call the primary security module to generate a working key for the business system, and obtain from the primary security module: a working key ciphertext encrypted by the master key of the primary security module, and a working key ciphertext encrypted by the target public key of the secondary security module; with the working key ciphertext encrypted by the target public key of the secondary security module as input, call the secondary security module to obtain from the secondary security module: a working key ciphertext encrypted by the master key of the secondary security module after decrypting the input working key ciphertext with the target private key; and
   the cryptographic operation calling module is configured to: receive a cryptographic operation request of the business system, the cryptographic operation request carrying data to be operated; determine a target security module responding to the cryptographic operation request; and with a working key ciphertext corresponding to the target security module and the data to be operated as input, call the target security module to obtain an operation result of the target security module, the operation result being obtained by the target security module using a stored master key to decrypt the working key ciphertext to obtain a working key, and encrypting the data to be operated with the working key obtained by decryption.

2. The cryptographic service device according to claim 1, wherein the target private key stored by the registration module is encrypted with the master key of the secondary security module.

3. The cryptographic service device according to claim 1, wherein the registration module is further configured to: obtain target private key indication data encrypted by the master key of the secondary security module; and
   when the secondary security module is called by the working key creation module, the target private key indication data is input to the secondary security module, for the secondary security module to obtain the target private key by using the master key of the secondary security module to decrypt the target private key indication data, and decrypt the input working key ciphertext.

4. The cryptographic service device according to claim 3, wherein the target private key indication data encrypted by the master key of the secondary security module comprises: a target private key ciphertext generated by encrypting the target private key with the master key of the secondary security module, or a target private key identifier encrypted with the master key of the secondary security module.

5. The cryptographic service device according to claim 1, wherein the registration module is further configured to:

with the target public key as input, call the primary security module for authenticating the target public key by the primary security module, and obtain a key check value obtained through performing, by the primary security module, message authentication code value calculation on the target public key;

wherein the key check value is input to the primary security module by the working key creation module when calling the primary security module, for the primary security module to check the input target public key of the secondary security module.

6. A cryptographic operation method, comprising:

receiving a cryptographic operation request initiated by a business system, the cryptographic operation request carrying data to be operated;

determining a target security module responding to the cryptographic operation request, the target security module being one of a plurality of security modules including a primary security module and at least one secondary security module, and the security modules having master keys;

obtaining a working key ciphertext corresponding to the target security module, the working key ciphertext being obtained in advance by: with a target public key generated by the secondary security module in advance as input, calling the primary security module to generate a working key for the business system, and obtain from the primary security module: a working key ciphertext encrypted by the master key of the primary security module, and a working key ciphertext encrypted by the target public key of the secondary security module; with the working key ciphertext encrypted by the target public key of the secondary security module as input, calling the secondary security module to obtain from the secondary security module: a working key ciphertext encrypted by the master key of the secondary security module after decrypting the input working key ciphertext with a target private key; and with the working key ciphertext and the data to be operated as input, calling the target security module to obtain an operation result returned by the target security module and send the operation result to the business system, the operation result being obtained by the target security module using a stored master key to decrypt the working key ciphertext to obtain a working key, and encrypting the data to be operated with the working key obtained by decryption.

7. The method according to claim 6, wherein the target private key is encrypted with the master key of the secondary security module.

8. The method according to claim 6, further comprising: obtaining target private key indication data encrypted by the master key of the secondary security module; and when the secondary security module is called, inputting the target private key indication data to the secondary security module, for the secondary security module to obtain a target private key by using the master key of the secondary security module to decrypt the target private key indication data, and decrypt the input working key ciphertext.

9. The method according to claim 8, wherein the target private key indication data encrypted by the master key of the secondary security module comprises: a target private key ciphertext generated by encrypting the target private key with the master key of the secondary security module, or a target private key identifier encrypted with the master key of the secondary security module.

10. The method according to claim 7, further comprising:

with the target public key as input, calling the primary security module, and obtaining a key check value obtained through performing, by the primary security module, message authentication code value calculation on the target public key; and when the primary security module is called to generate a working key for the business system, inputting the key check value to the primary security module to check the input target public key of the secondary security module.

11. A non-transitory computer-readable storage medium having stored therein instructions that, when executed by a processor of a device, cause the device to perform a cryptographic operation method, the method comprising:

receiving a cryptographic operation request initiated by a business system, the cryptographic operation request carrying data to be operated;

determining a target security module responding to the cryptographic operation request, the target security module being one of a plurality of security modules including a primary security module and at least one secondary security module, and the security modules having master keys;

obtaining a working key ciphertext corresponding to the target security module, the working key ciphertext being obtained in advance by: with a target public key generated by the secondary security module in advance as input, calling the primary security module to generate a working key for the business system, and obtain from the primary security module: a working key ciphertext encrypted by the master key of the primary security module, and a working key ciphertext encrypted by the target public key of the secondary security module; with the working key ciphertext encrypted by the target public key of the secondary security module as input, calling the secondary security module to obtain from the secondary security module: a working key ciphertext encrypted by the master key of the secondary security module after decrypting the input working key ciphertext with a target private key; and with the working key ciphertext and the data to be operated as input, calling the target security module to obtain an operation result returned by the target security module and send the operation result to the business system, the operation result being obtained by the target security module using a stored master key to decrypt the working key ciphertext to obtain a working key, and encrypting the data to be operated with the working key obtained by decryption.

12. The non-transitory computer-readable storage medium according to claim 11, wherein the target private key is encrypted with the master key of the secondary security module.

13. The non-transitory computer-readable storage medium according to claim 11, the method further comprising:

obtaining target private key indication data encrypted by the master key of the secondary security module; and when the secondary security module is called, inputting the target private key indication data to the secondary security module, for the secondary security module to obtain a target private key by using the master key of the secondary security module to decrypt the target private key indication data, and decrypt the input working key ciphertext.

14. The non-transitory computer-readable storage medium according to claim 13, wherein the target private key indication data encrypted by the master key of the secondary security module comprises: a target private key ciphertext generated by encrypting the target private key with the master key of the secondary security module, or a target private key identifier encrypted with the master key of the secondary security module.

15. The non-transitory computer-readable storage medium according to claim 11, the method:
- with the target public key as input, calling the primary security module, and obtaining a key check value obtained through performing, by the primary security module, message authentication code value calculation on the target public key; and
- when the primary security module is called to generate a working key for the business system, inputting the key check value to the primary security module to check the input target public key of the secondary security module.

* * * * *